United States Patent

Destefan et al.

[15] 3,641,764
[45] Feb. 15, 1972

[54] HYDRAULIC SYSTEM FOR SEQUENTIAL CONTROL OF HYDRAULIC MOTORS

[72] Inventors: John F. Destefan, Waynesboro; James J. Ezolt, State Line; James Martin Benchoff, Waynesboro, all of Pa.

[73] Assignee: Grove Manufacturing Company, Shady Grove, Pa.

[22] Filed: Apr. 9, 1970

[21] Appl. No.: 31,441

Related U.S. Application Data

[62] Division of Ser. No. 745,165, July 16, 1968, Pat. No. 3,520,434.

[52] U.S. Cl............................60/52 R, 60/53 R, 91/411 R, 60/52 HE
[51] Int. Cl........................................................F15b 11/16
[58] Field of Search......................60/52 R, 53 R; 91/411 R

[56] References Cited

UNITED STATES PATENTS

| | | | |
|---|---|---|---|
| 2,111,134 | 3/1938 | Allin | 60/97 P UX |
| 2,112,466 | 3/1938 | Maloon | 60/52 HE |
| 3,348,624 | 10/1967 | Just et al. | 60/53 R |

*Primary Examiner*—Edgar W. Geoghegan
*Attorney*—Brady, O'Boyle & Gates

[57] ABSTRACT

A hydraulic control system for a self-unloading vehicle having at least a pair of conveyors and beaters operated by individual hydraulic motors for unloading forage from the vehicle body, which preferably utilizes the existing hydraulic pump and reservoir system on a tractor adapted to tow the vehicle and which includes valves adapted to sequentially connect the fluid motors for the conveyors and beaters in a series circuit. One of the valves is connected as a safety valve to stop operation of all of the hydraulic motors. The circuit is arranged so that by reversing the connections of the hydraulic lines to the tractor one of the conveyors can be operated at adjustable speeds in reverse by one of the valves. The hydraulic system is also provided with means to provide the same hydraulic fluid flow rate through the system independent of the output of the tractors hydraulic system so that the self-unloading vehicle may be used with all sizes of tractors.

4 Claims, 8 Drawing Figures

PATENTED FEB 15 1972

INVENTORS
JOHN F. DESTEFAN
JAMES J. EZOLT
JAMES MARTIN BENCHOFF

BY Brady, O'Boyle & Gates

ATTORNEYS

HYDRAULIC SYSTEM FOR SEQUENTIAL CONTROL OF HYDRAULIC MOTORS

CROSS-REFERENCE TO RELATED APPLICATION

This application is a division of copending application Ser. No. 745,165, filed July 16, 1968, now U.S. Pat. No. 3,520,434 issued July 14, 1970, for HYDRAULICALLY OPERATED SELF-UNLOADING VEHICLE.

BACKGROUND OF THE INVENTION

The present invention is directed to a hydraulically operated self-unloading body which may be either a stationary or a transportable body, which consists of a boxlike body or container for discharging, or mixing and discharging, a variety of produce materials such as forage, fodder, hay, ear corn, grain, tobacco, etc., in controlled and varying amounts from a selected discharge point on the body. Self-unloading bodies of the type contemplated herein have been known in the art and preferably consist of a large boxlike structure normally connected on a conventional wagon running gear or trailer and adapted for towing behind a tractor, or the like. An endless deck or apron conveyor is supported by the floor or bed of the body and operates longitudinally of the body between the sidewalls thereof to convey produce toward one end of the body. A horizontal transverse discharge conveyor or cross-conveyor is mounted on the body adjacent one end of the deck conveyor to receive the produce conveyed by that conveyor and is adapted to be operated in opposite directions to selectively discharge produce from opposite sides of the body. Rotatable beater shafts are also connected on the body spanning the interior thereof between the body sidewalls and somewhat above the rear portion of the cross-conveyor to regulate the discharge of produce from the deck conveyor onto the endless cross-conveyor. One such self-unloading body of the type described is disclosed in U.S. Pat. No. 3,214,049, issued to Dwight L. Grove on Oct. 26, 1965 and owned by the same assignee as the present application. However, in the prior art bodies, as illustrated by the mentioned patent, the various conveyors and beaters are driven by a plurality of clutches and endless chain and sprocket gearing driven by the rotating power takeoff of a towing vehicle. The amount of gearing for driving the various conveyors is considerable and since there are so many moving parts the gearing requires constant maintenance to maintain the body in proper operating condition. Several mechanical clutches are provided in the prior art body for selectively operating the cross-conveyor in opposite directions to discharge the produce from either one side or the other of the body and for operating the deck conveyor in opposite direction to discharge produce from a rear end gate on the body, when desired.

The object of the present invention is to provide a hydraulic control system for operating the various conveyors and beaters of a self-unloading body of the type disclosed in the mentioned patent to eliminate the massive mechanical gearing and the plurality of mechanical clutches, as well as eliminating the need of the potential hazard of the rotating power takeoff connection between the self-unloading body and the towing vehicle. A completely hydraulically operated self-unloading vehicle having a pair of endless conveyors operating at right angles to each other has heretofore been unknown in the art and the hydraulic control system of the subject invention renders such a self-unloading body more maneuverable, safer and easier to operate and more maintenance free.

SUMMARY OF THE INVENTION

The previously mentioned advantages of the hydraulically operated self-unloading body of the invention are effected by a hydraulic control system in which separate hydraulic motors connected to operate the cross-conveyor, beaters, and deck conveyor are sequentially connected into a series hydraulic circuit by manipulation of three hydraulic valves connected to respectively supply hydraulic fluid to the hydraulic motors only when operated in a predetermined sequence. The circuit is connected to preferably receive fluid under pressure from the existing hydraulic pump and reservoir system on the towing vehicle, such as a tractor, with the hydraulic control circuit on the self-unloading body connected to the hydraulic system on the towing vehicle by means of quick-disconnect connections on the ends of a pair of flexible fluid conduits. The hydraulic valve which controls the operation of the cross-conveyor hydraulic motor is connected into the hydraulic control circuit at all times and serves as a safety valve to quickly stop operation of all of the conveyors and beaters and their respective hydraulic motors, if an emergency arises, during normal operation of the self-unloading body, such as someone falling into the body, or the like.

By reversing the pair of flexible fluid conduits connecting the hydraulic control system of the self-unloading body to the hydraulic system of the towing vehicle, the deck conveyor may be operated at selected speeds, independent of the cross-conveyor and the beaters, to discharge produce from the rear end gate of the body. The hydraulic motor operating the cross-conveyor is also provided with a pair of quick-disconnect connections connecting the motor into the hydraulic control circuit which may be easily reversed to reverse the connection of the motor in the circuit to operate the cross-conveyor in the opposite direction. With this arrangement the cross-conveyor can discharge forage or the like from either side of the vehicle and the mechanism for accomplishing the operation is much simpler than the reversing clutch and additional chain and sprocket gearing required in the prior art vehicle.

The hydraulic control circuit for the self-unloading vehicle also includes a selectively adjustable bypass valve arrangement connected between the two fluid conduits connecting the control circuit to the hydraulic pump and reservoir system, which enables the hydraulic control circuit to be utilized with hydraulic systems of all sizes on towing vehicles by providing an adjustment to obtain a preselected hydraulic fluid flow rate through the hydraulic control system on the self-unloading vehicle even though the flow rate delivered by the pump on the towing vehicle is greater than required for the self-unloading vehicle.

It is within the contemplation of the invention that the hydraulic pump and reservoir may be contained on the self-unloading vehicle, although they are described and illustrated herein as preferably being contained in the existing hydraulic system on a vehicle used for towing the self-unloading vehicle.

DESCRIPTION OF THE PREFERRED EMBODIMENT

Figure 1:
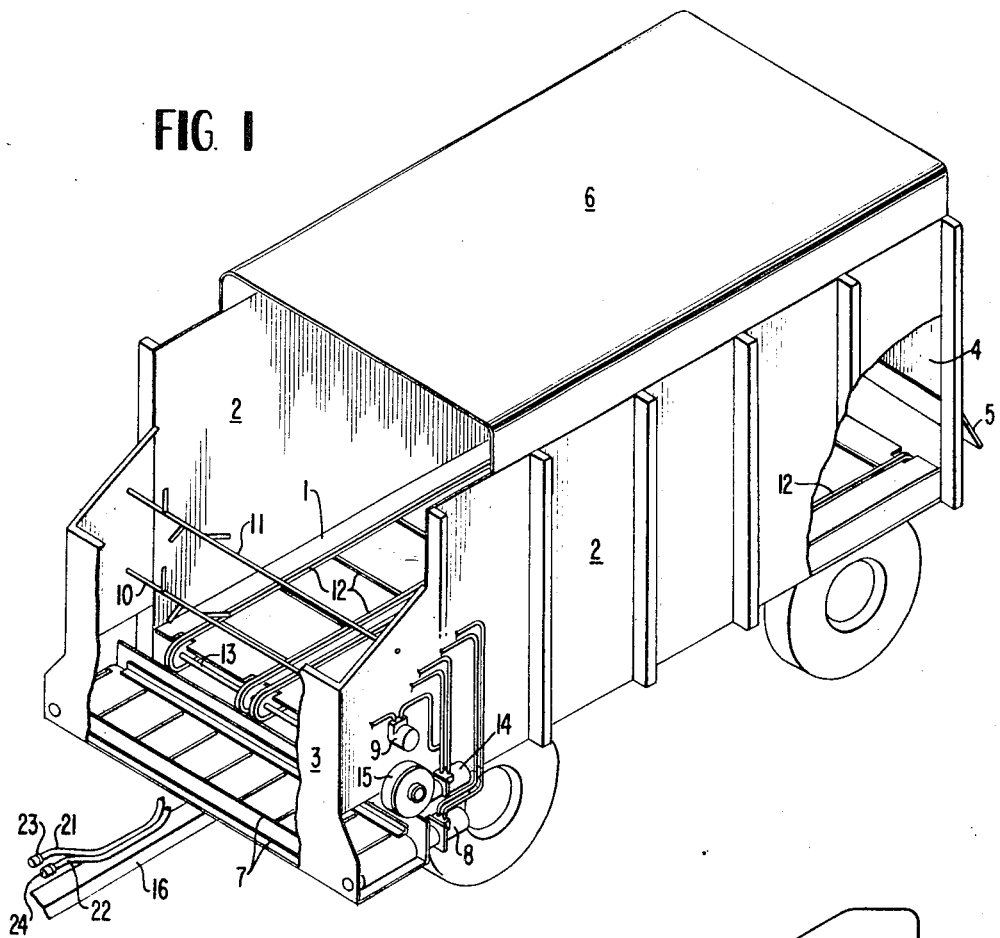
FIG. 1 is a simplified perspective view, with parts being broken away, of the hydraulically operated self-unloading vehicle of the invention.
Figure 2:
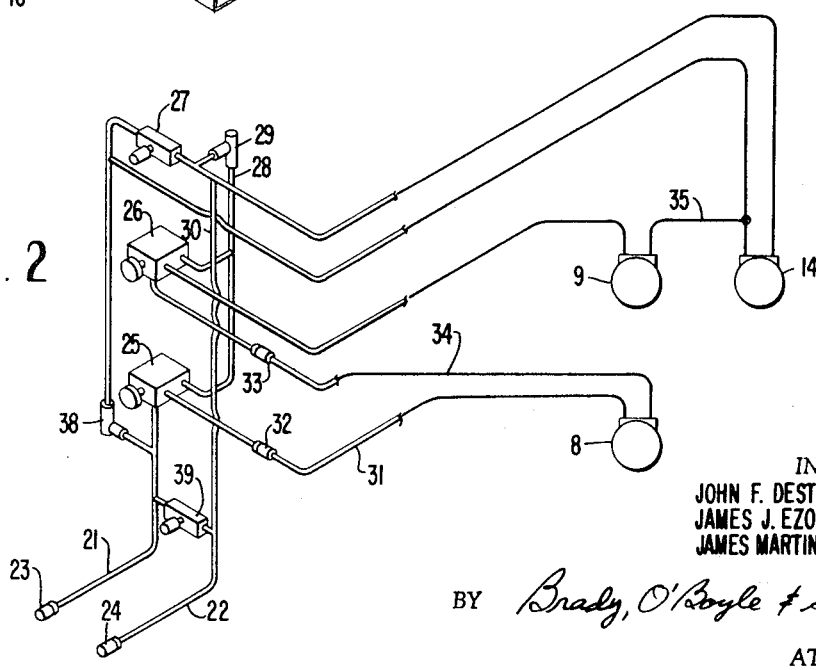
FIG. 2 is a perspective view, partly in schematic form, showing the arrangement of the hydraulic control system on the body of the self-unloading vehicle.

Referring to the drawings, in greater detail and specifically to FIG. 1, the construction of the basic self-unloading body, exclusive of the drive system, is substantially the same as that disclosed in U.S. Pat. No. 3,214,049, and the description and disclosure of the detailed construction and mounting of the various conveyors, beaters, etc., disclosed therein, is relied upon and incorporated herein by reference. The self-unloading body consists of a large boxlike structure having a horizontal floor or bed 1, vertical sidewalls 2, and a foreshortened forward end wall 3. The rear end wall 4 of the body is equipped with a rear end gate 5 of any preferred type which can be opened to provide an opening adjacent to the bed when the vehicle is operated to discharge produce from the rear. The body may be entirely open at its top or covered by a roof structure 6 which will allow filling the body with material through an open area above the foreshortened forward end wall.

An endless cross-conveyor 7 is mounted for rotation across the front of the body, transversely of the body, and positioned somewhat below the bed 1. A first hydraulic motor 8 is connected to drive one of the roller shafts supporting opposite ends of cross-conveyor to cause movement of the conveyor transversely of the body. A second hydraulic motor 9 is connected to sidewall 2 of the body and is connected to rotate the shaft of the lower beater member 10 which is connected transversely of the interior of the body between the sidewalls 2 and is journaled for rotation within end bearings supported by said walls. One or more upper beater members 11 in turn are driven in unison with lower beater member 10 by chain and sprocket gearing or the like (not shown) connected between the ends of the respective shafts thereon. These vertically, spaced rotating beaters 10 and 11 are driven in unison to continuously agitate and break up material which may tend to become caked and the beaters also tend to regulate the passage of material from the deck conveyor 12 onto the cross-conveyor 7 beneath lower beater member 10. The upper beater member 11, or beaters, prevents the material near the top of the boxlike body from sliding forward in great masses onto the cross-conveyor 7, as this would be undesirable. Beaters operating in unison tend to retard the forward movement of the material with the main deck conveyor 12 and provide a regulated discharge from the lower portion of the mass of material in the body onto the cross-conveyor.

Endless deck conveyor 12 preferably consisting of longitudinally extending endless side and intermediate deck or apron chains, connected by cross flights which engage the material, is connected for rotation on shafts at opposite ends of the bed with one of the shafts being shown at 13. A third hydraulic motor 14 is connected through worm gearing 15 to rotate shaft 13 and thus rotate the endless deck conveyor 12 longitudinally of the body. The deck chains of conveyor 12 have their top runs sliding upon the bed 1 from the rear to the front of the body while the bottom runs of the deck chains extend and operate beneath the body bed 1 with suitable support or slack takeup means, as desired. Deck conveyor 12, when rotated, propels material in the body longitudinally of the bed toward the cross-conveyor 7 for discharge thereon, or rearwardly of the bed for discharge through rear end gate 5.

The basic self-unloading body can be mounted on a stationary structure or installed upon skids, or as shown in FIG. 1 preferably installed upon a conventional wagon running gear or trailer having a draw tongue 16 for connection to a towing vehicle such as a tractor. The body may also be affixed to a truck or other self-propelled vehicle. Since all of the movable conveyors or beaters on the body are driven by a hydraulic control system, the body is highly flexible in operation and capable of a variety of uses.

In the mentioned preferred embodiment, the draw tongue 16 is connected to a towing farm tractor or the like, and the front axle, not shown, of the self-unloading body is a steering axle. The hydraulic control system of the invention is designed to utilize the existing hydraulic system on the towing vehicle consisting of a hydraulic pump 17 connected to draw hydraulic fluid from reservoir 18 and deliver the fluid under pressure from an output pressure port 19. A return port 20 is connected to return hydraulic fluid to the vented reservoir.

The hydraulic control system on the self-unloading body is connected to the hydraulic system on the towing vehicle by a pair of flexible hydraulic hoses 21 and 22 terminating in conventional quick-disconnect hydraulic fittings 23 and 24, respectively, for connection with the towing vehicle output pressure port 19 and return port 20, respectively as shown in FIGS. 3A–3D, when it is desired to have the material in the body unloaded from the front portion thereof by cross-conveyor 7. FIGS. 3A–3D therefore illustrate sequential steps in the operation of the hydraulic control circuit for front unloading of the body.

Figure 3A:
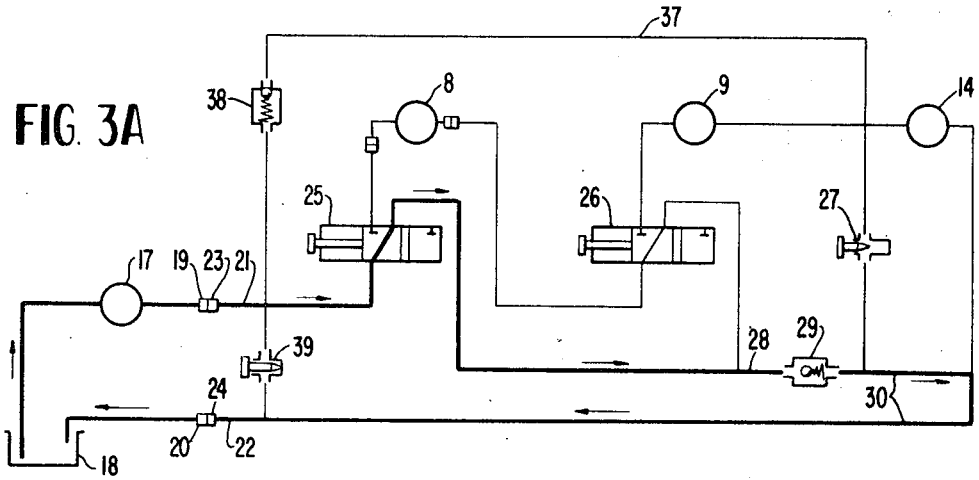
FIGS. 3A–3D are schematic diagrams of the hydraulic control system of the invention and illustrating the flow of hydraulic fluid through the circuit upon sequential operation of the various valves for effecting the forward unloading of the vehicle.

Referring to the hydraulic circuit diagram of FIG. 3A the control circuit contains a pair of hydraulic control valves 25 and 26, which are preferably two-position, push-pull-type valves which are pushed to their innermost positions as shown in FIG. 3A in the idle state of the hydraulic control circuit and the self-unloading body. The hydraulic circuit also contains a turn-type needle valve 27 having a rotatable control knob thereon which is turned counterclockwise to open the valve, as shown in FIG. 3A, before commencing operation of the body. Push-pull control valve 25 is a dual-purpose valve connected to start cross-conveyor 7 when the knob thereof is pulled outwardly and to stop the conveyor when the knob is pushed in. This valve is also connected in the main hydraulic fluid supply line from pump 17 and when all conveyors and beaters are in operation it serves as an emergency safety valve to instantly stop all mechanical motion when it is pushed in. Push-pull control valve 26 is connected to start operation of the beater members 10 and 11 when the control knob thereof is moved to the outermost position and to stop operation of the beater members when the control knob is moved to the innermost position. Needle valve 27 is connected to control the operation of deck conveyor or deck chain 12 at selected adjusted speeds. The deck conveyor runs at its highest speed when the turn knob of the needle valve is rotated to completely close the valve, and turning the knob in the opposite direction to open the valve slows the speed of the deck conveyor 12.

In the idle state of the hydraulic control system and the body, the control knobs of control valves 25 and 26 are pushed to the innermost positions and the turn knob of needle valve 27 is rotated to open the valve as shown in FIG. 3A. The hydraulic system on the tractor is engaged and the throttle control of the tractor is set for sufficient r.p.m. so that hydraulic pump 17 delivers approximately 7 or 8 gallons of hydraulic fluid per minute to control valve 25 through hydraulic hose or line 21. The hydraulic systems of medium- and smaller-type farm tractors, most commonly used, operate at pressures in the range of 1,500–2,000 p.s.i. and deliver hydraulic fluid at the rate of approximately 7 to 8 g.p.m. and the hydraulic control circuit disclosed herein is designed to operate at its maximum efficiency within these ranges of pressure and hydraulic fluid flow. The circuit will operate at a lower rate of fluid flow but the various systems will function at a slower rate. In the idle state of the system, valve 25 directs the fluid supplied thereto to conduit 28 through direction control check valve 29 which is connected to pass the fluid to hydraulic conduit 30 and back to reservoir 18 through hydraulic hose 22, quick-disconnect fitting 24, and return port 20.

Figure 3B:
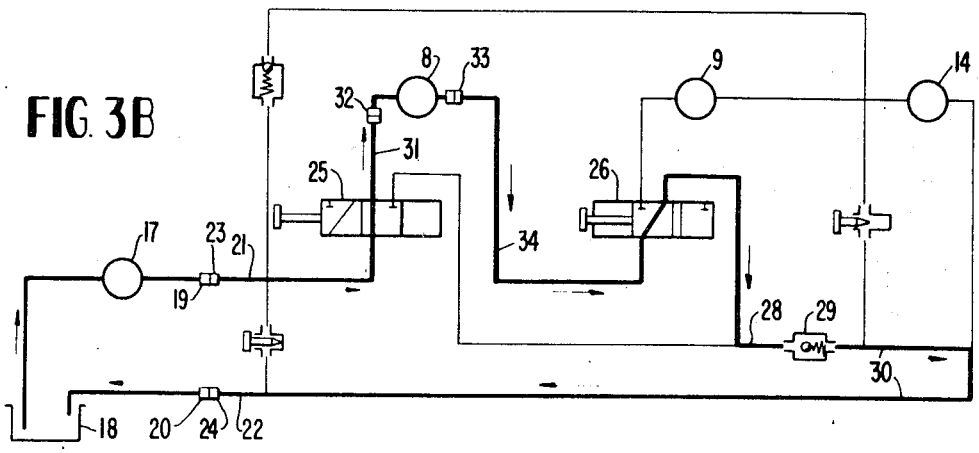

The control knob of control valve 25 is then moved to the outermost position as shown in FIG. 3B, cutting off the supply of fluid to conduit 28 and directing the fluid through conduit 31, quick-disconnect fitting 32, cross-conveyor hydraulic motor 8, quick-disconnect fitting 33, conduit 34, and back to reservoir 18 through control valve 26, conduit 28, check valve 29, conduit 30, hose 22, hydraulic fitting 24, and return port 20. This operation commences operation of cross-conveyor 7 in one direction since it is driven by hydraulic motor 8. The throttle control on the tractor is adjusted to obtain a reasonable unloading speed on cross-conveyor 7, and the conveyor is run until it is cleared of all produce or forage material. In this state of operation, 7 or 8 g.p.m. of hydraulic fluid are flowing through cross-conveyor hydraulic motor 8 and the fluid flow path through the circuit is shown by the heavy dark lines in FIG. 3B as well as in the other circuit diagrams.

Figure 3C:
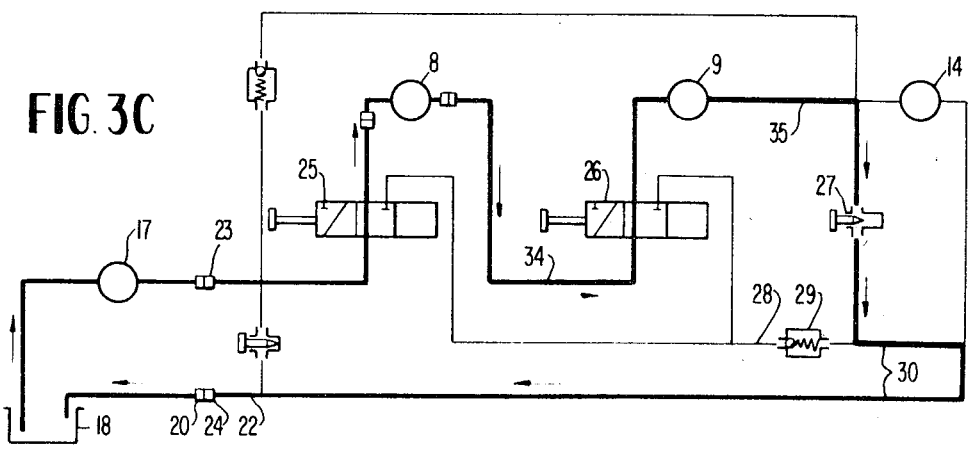
Figure 3D:
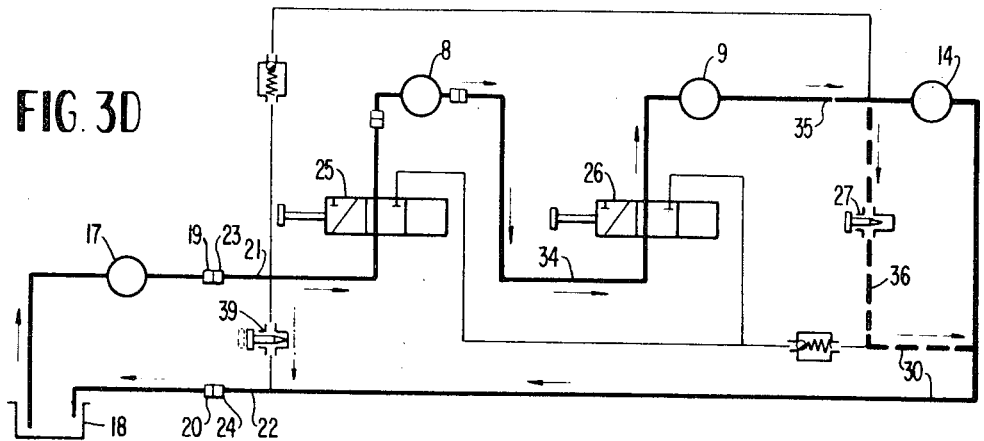

The control knob of control valve 26 is then moved from its innermost to its outermost position, as shown in FIG. 3C, cutting off supply of hydraulic fluid to conduit 28 from conduit 34 and directing that fluid flow through second hydraulic motor 9 to start the operation of beater members 10 and 11 connected thereto. Control 26 thus connects hydraulic motor 9 in a series hydraulic circuit with hydraulic motor 8, and the hydraulic fluid output from motor 9 is returned to reservoir 18 through conduit 35, open needle valve 27, conduit 30, and elements 22, 24 and 20. When beater members 10 and 11 are running free of the produce or forage material in the body the endless deck conveyor 12 is actuated to commence movement of the mass of material forwardly toward the cross-conveyor 7 by rotating the turn knob of needle valve 27 in a clockwise direction to progressively close the valve, as shown in FIG. 3D, to divert the hydraulic fluid output of motor 9 in conduit 35 through third hydraulic motor 14 which operates deck conveyor 12. Needle valve 27 is closed to a point until the desired speed of deck conveyor 12 is obtained to give a satisfactory unloading speed of material from the body. The deck conveyor moves material onto the cross-conveyor and it unloads that material from one side of the vehicle. The speed of the deck conveyor determines the amount of material deposited on the cross-conveyor and thus the unloading rate of the material from the body and needle valve 27 enables the operator to selectively adjust the speed of the deck conveyor. As indicated by the broken line at 36 in FIG. 3D, during normal body unloading operation, the entire hydraulic fluid flow output from motor 9 is not directed through motor 14 as needle valve 27 bypasses a portion of the fluid around motor 14 where it then combines with the fluid output from motor 14 and is returned to reservoir 18 through conduit 30, hose 22, fitting 24 and return port 20.

No other adjustments of the valves are necessary until the body is nearly emptied of material and the feeding of material from the deck conveyor onto the cross-conveyor becomes light. The turn knob of needle valve 27 is then rotated further clockwise to close the valve to greater extent, and possibly close it completely, until a good sweep-speed of deck conveyor 12 is achieved to complete the unloading of the body. It is to be noted that increasing the r.p.m. of the tractor will also speed up deck conveyor 12 and raise the sweep-speed thereof, since this increases the flow rate of hydraulic fluid through deck conveyor hydraulic motor 14.

When unloading of the body has been completed the control knobs of control valves 25 and 26 are pushed to their innermost positions, and the turn knob of needle valve 27 is rotated counterclockwise to open the needle valve, as shown in FIG. 3A. The body and the hydraulic control system in this state is again ready to receive the next load of material.

If it is desired to have cross-conveyor 7 operate in the opposite direction to unload material from the opposite side of the body, it is only necessary to reverse the connection of the two quick-disconnect fittings 32 and 33 which connect cross-conveyor hydraulic motor 8 into the control circuit. This reversal of connections is done before the hydraulic circuit is energized and it reverses the rotation of motor 8 which in turn reverses the direction of travel of the cross-conveyor. The two quick-disconnect fittings 32 and 33, as well as the control valves 25, 26 and 27, are conveniently located on the forward end of wall 3 of the body immediately behind and within easy reach of the operator on the towing vehicle. If an emergency arises during operation of the self-unloading vehicle, such as someone, or some object, falling into the vehicle in the vicinity of the beaters or the conveyors, it is only necessary for the operator to turn around and push-in the control knob of control valve 25 to instantly stop all mechanical motion in the body and return the control circuit to the idle state as shown in FIG. 3A. The control knob for this valve can be appropriately colored to make it prominent and to distinguish it from the other valves.

From FIGS. 3A–3D it can be appreciated that the circuit is designed from a safety standpoint as the various valves must be operated in a definite sequence in order to operate the unloading systems. This is a deterrent against inexperienced operators damaging the unloading systems, or children playing around an idling unloading system from becoming injured or causing damage to the unloading systems. For instance, if control valve 26 is actuated before control valve 25, none of the unloading systems will be activated. This prevents the possibility of bending the beater members by rotating them in a mass of material forwardly of the body which has not been cleared away by the cross-conveyor. Also, operation of needle valve 27 before operation of both control valves 25 and 26 will not result in activation of any of the unloading systems. Control valve 25 must first be pulled out before any of the systems will operate and by pushing-in on this valve all of the unloading systems in operation will be immediately stopped.

Figure 4A:
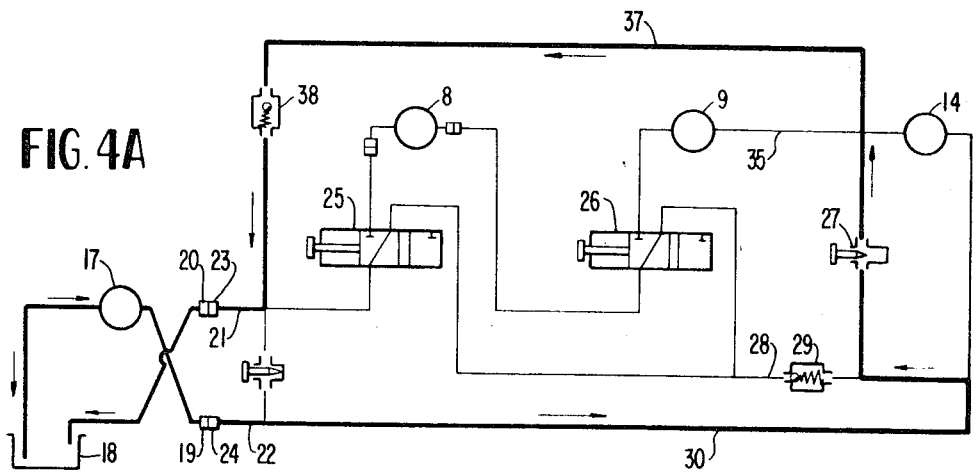
FIGS. 4A and 4B are schematic diagrams similar to FIGS. 3A–3D, but showing the inputs of the hydraulic control circuit from the towing vehicle reversed to effect rear unloading of the body.
Figure 4B:
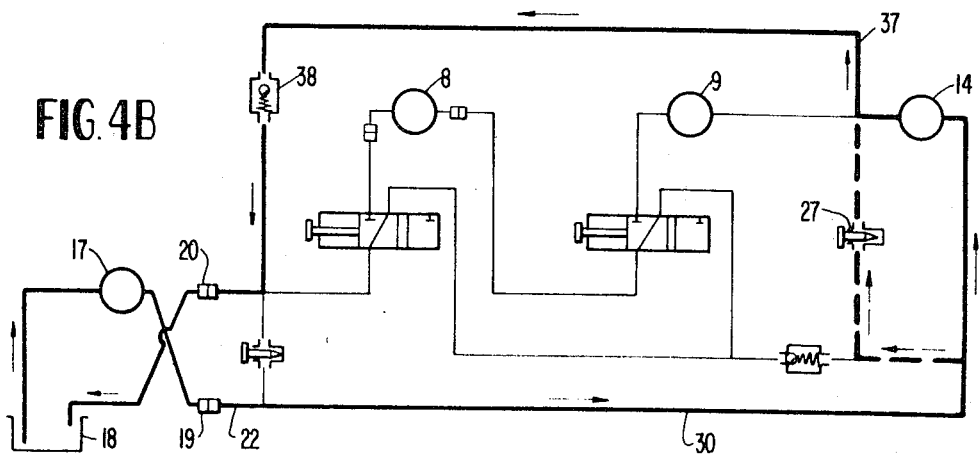

To operate the self-unloading body to discharge material from the rear thereof, the rear end gate is unlatched and secured in an open position providing a sufficiently wide opening to allow discharge of material to the rear of the vehicle. As shown in FIGS. 4A and 4B, the connections of the flexible hoses 21 and 22 with the output pressure port 19 and return port 20 of the hydraulic system on the tractor are reversed from the connections used for front unloading of the body as shown in FIGS. 3A–3D, with quick-disconnect fitting 24 of flexible hose 22 connected to output pressure port 19 and quick-disconnect fitting 23 of flexible hose 21 connected to return port 20.

With needle valve 27 in the open position, the hydraulic system on the tractor is engaged and the throttle is set for sufficient r.p.m. so that pump 17 delivers approximately 7 or 8 gallons of hydraulic fluid per minute through elements 19, 24, 22, conduit 30, open needle valve 27, return conduit 37, direction control check valve 38 which is moved to the open position, flexible hydraulic hose 21 and elements 23 and 20, back to reservoir 18. This is the idle state of the hydraulic control circuit as shown in FIG. 4A, arranged for rear unloading of the body. With valve 27 open hydraulic fluid does not pass through hydraulic motor 14 because the open valve is the path of least resistance. Since control valve 26 is pushed to its innermost position it blocks movement of hydraulic fluid through conduit 35 and hydraulic motor 9, and the hydraulic fluid flow in conduit 30 retains check valve 29 in closed position to prevent fluid flow in conduit 28 to the valves 25 and 26 since the check valve is connected in the circuit only to allow passage of fluid in the direction of conduit 30 from conduit 28.

As shown in FIG. 4B the turn knob of needle valve 27 is then rotated clockwise to gradually close the valve and this restriction in the hydraulic line causes a portion of the hydraulic fluid to flow through deck conveyor hydraulic motor 14 to operate deck conveyor 12 in a reverse direction to move material toward and out of the open end gate 5. Needle valve 27 is adjusted toward the closed position until a desired unloading speed of the deck conveyor is attained.

An alternate method for rear unloading of the body is to completely close needle valve 27 so that the entire hydraulic fluid flow is directed through hydraulic motor 14. The unloading speed of the deck conveyor is then controlled by adjusting the throttle of the tractor. Increasing the r.p.m. of the tractor will speed up the unloading of the body as this increases the rate of flow of hydraulic fluid in the system from pump 17, and decreasing the r.p.m. of the tractor will slow down the unloading of the body. To stop the rear unloading needle valve 27 must be opened or the hydraulic pump system on the tractor must be disengaged.

In order to operate the hydraulic control circuit of the invention with larger size tractors having hydraulic systems delivering hydraulic fluid at higher rates than the 7 or 8 g.p.m. required for operating the subject system, that is, for example, systems which deliver fluid at the rate of 15 to 20 g.p.m., a normally closed turn-type needle valve 39, similar to valve 27, is connected in the circuit between hydraulic hoses 21 and 22. In order to reduce the higher rate of flow of hydraulic fluid to that needed to operate the self-unloading body, the needle valve is gradually opened, as shown in the dotted position in FIG. 3D, to pass the excess flow of hydraulic fluid supplied through output pressure port 19 from pump 17 immediately back to reservoir 18 through hydraulic hose 22, fitting 24 and return port 20. Needle valve 39 thus functions to meter out the 7 or 8 g.p.m. flow rate to control valve 25 that is required to operate the unloading systems and returns the excess hydraulic fluid back to the tractor reservoir.

It is to be understood that the hydraulic pump 17 and reservoir 18 can be a part of the self-unloading vehicle rather than remote therefrom on a towing vehicle. The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

What we claim is:

1. A hydraulic control system; comprising a constant displacement pump adapted to supply a flow of hydraulic fluid; a reservoir of hydraulic fluid connected to supply said pump; first, second and third hydraulic motors each having an inlet and an outlet port; first, second and third control valve means respectively alternately connected in series circuit between said pump, the ports of said first and second hydraulic motors and said reservoir; the ports of said third hydraulic motor connected across said third control valve means; each of said control valve means having an input and movable between a first position directing the hydraulic fluid at the valve input to said reservoir and a second position directing the hydraulic fluid at the valve input to the succeeding hydraulic motor means in the series circuit so that sequential movement of said first, second and third control valve means to the second position successively operatively connects said first, second and third hydraulic motor means in series; whereby said first control valve means must be moved to its second position before any of said hydraulic motor means are actuated and upon moving said first control valve means to its first position movement of all actuated hydraulic motor means is stopped.

2. A hydraulic control system as set forth in claim 1 in which the input of said first control valve means is connected to receive hydraulic fluid from said pump, said first and second control valve means each having first and second outputs corresponding to said first and second positions of said valves, said second output of said first control valve means connected to the inlet port of said first hydraulic motor means, the outlet port of said first hydraulic motor means connected to the input of said second control valve means, said second output of said second control valve means connected to the inlet port of said second hydraulic motor means, and the outlet port of said second hydraulic motor means connected to the input of said third control valve means and the inlet port of said third hydraulic motor means.

3. A hydraulic control system as set forth in claim 1 in which said third control valve means is normally open in said first position, said third control valve having a range of openings between said first and second positions and adjustable toward said second position to increase the speed of said third hydraulic motor means.

4. A hydraulic control system as set forth in claim 2 including quick-disconnect coupling means connected to said inlet and outlet ports of said first hydraulic motor means, whereby the connection of the inlet and outlet ports of said first hydraulic motor means to said first and second control valve means are reversible by said quick-disconnect coupling means to reverse the direction of operation of said first hydraulic motor means.

* * * * *